(12) United States Patent
Yamada

(10) Patent No.: US 11,536,230 B1
(45) Date of Patent: Dec. 27, 2022

(54) CHARGE-AIR COOLER AND WATER DISTRIBUTION DEVICE TO EVENLY PROVED WATER TO ENGINE CYLINDERS

(71) Applicant: FORD GLOBAL TECHNOLOGIES, LLC, Dearborn, MI (US)

(72) Inventor: Shuya Shark Yamada, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/510,465

(22) Filed: Oct. 26, 2021

(51) Int. Cl.
*F02M 31/20* (2006.01)
*F02M 35/10* (2006.01)
*F02M 35/104* (2006.01)

(52) U.S. Cl.
CPC .......... *F02M 31/20* (2013.01); *F02M 35/104* (2013.01); *F02M 35/10262* (2013.01)

(58) Field of Classification Search
CPC . F02M 31/20; F02M 35/10262; F02M 35/104
See application file for complete search history.

(56) References Cited

U.S. PATENT DOCUMENTS

| 7,266,958 | B2 | 9/2007 | Milde et al. |
| 8,056,534 | B2 | 11/2011 | Magnan et al. |
| 8,132,559 | B2 | 3/2012 | Dong et al. |
| 8,474,558 | B2 | 7/2013 | Ohira et al. |
| 9,046,063 | B2 | 6/2015 | Landgraf et al. |
| 9,545,844 | B2 | 1/2017 | Forty et al. |
| 9,617,909 | B2 | 4/2017 | Styles et al. |
| 10,280,879 | B2 | 5/2019 | Stempien et al. |
| 2004/0079079 | A1 | 4/2004 | Martin et al. |
| 2010/0229549 | A1 | 9/2010 | Taylor |
| 2013/0220457 | A1* | 8/2013 | Bishop ................ F02B 29/0468 137/544 |
| 2015/0285129 | A1* | 10/2015 | Dziubinschi ........ F02B 29/0468 60/599 |
| 2022/0025811 | A1 | 1/2022 | Fagerstrom et al. |

FOREIGN PATENT DOCUMENTS

JP  2237066  * 10/1990 ............. F02M 35/10
JP  5867322 B2  1/2014

* cited by examiner

*Primary Examiner* — Syed O Hasan
(74) *Attorney, Agent, or Firm* — Vincent Mastrogiacomo; Brooks Kushman P.C.

(57) ABSTRACT

An engine includes a block defining cylinders, a charge-air cooler, and an intake manifold configured to receive air from the charge-air cooler and convey the air to the cylinders. The intake manifold includes an inlet connected in fluid communication with the charge-air cooler, a plurality of runners each associated with one of the cylinders, and a wedge disposed in an air path between the inlet and the runners with a leading edge of the wedge facing the inlet. The wedge is configured to deflect water, condensed in the charge-air cooler, to distribute the water among the runners.

12 Claims, 3 Drawing Sheets

CHARGE-AIR COOLER AND WATER DISTRIBUTION DEVICE TO EVENLY PROVED WATER TO ENGINE CYLINDERS

TECHNICAL FIELD

This discloses relates to forced-induction engines and more specifically to an intake manifold with a water-distribution device.

BACKGROUND

Turbocharged and supercharged engines may be configured to compress ambient air entering the engine in order to increase power. Because compression of the air may cause an increase in temperature of the air, a charge-air cooler (sometimes called an intercooler) may be utilized to cool the heated air thereby increasing its density and further increasing the potential power of the engine.

SUMMARY

According to one embodiment, an engine includes a block defining cylinders, a charge-air cooler, and an intake manifold configured to receive air from the charge-air cooler and convey the air to the cylinders. The intake manifold includes an inlet connected in fluid communication with the charge-air cooler, a plurality of runners each associated with one of the cylinders, and a wedge disposed in an air path between the inlet and the runners with a leading edge of the wedge facing the inlet. The wedge is configured to deflect water, condensed in the charge-air cooler, to distribute the water among the runners.

According to another embodiment, an intake manifold of an engine includes an inlet connectable to a charge-air cooler, a common chamber downstream of the inlet, and a plurality of runners downstream of the common chamber and configured to route air from the common chamber to associated engine cylinders. A water deflector is disposed in the common chamber in an air path between the inlet and the runners. The water deflector is arranged to deflect water, formed in the charge-air cooler, towards at least one of the runners and away from another of the runners.

According to yet another embodiment, an engine includes a block defining cylinders, a charge-air cooler, and a cylinder head defining an intake manifold in fluid communication with the charge-air cooler. The intake manifold includes a common chamber, a plurality of runners downstream of the common chamber and configured to route air from the common chamber to associated ones of the cylinders, and a water deflector disposed in the common chamber and arranged to deflect water, formed in the charge-air cooler, towards at least one of the runners and away from another of the runners.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

If the humidity of the ambient air is high, the air is cold, and/or the engine is equipped with exhaust gas recirculation (EGR), then condensation (e.g., water droplets) may form on any internal surface of the charge-air cooler that is cooler than the dew point of the air. This condensed water may be collected in a water reservoir. This water, either liquid or vapor, may be drawn into the engine combustion chambers resulting in engine misfire, loss of torque and engine speed, hydro-lock, or incompletely burned fuel, for example. As will be described in more detail below, the intake manifold of the engine may be designed to manage this water and mitigate negative consequences associated therewith.

Figure 1:
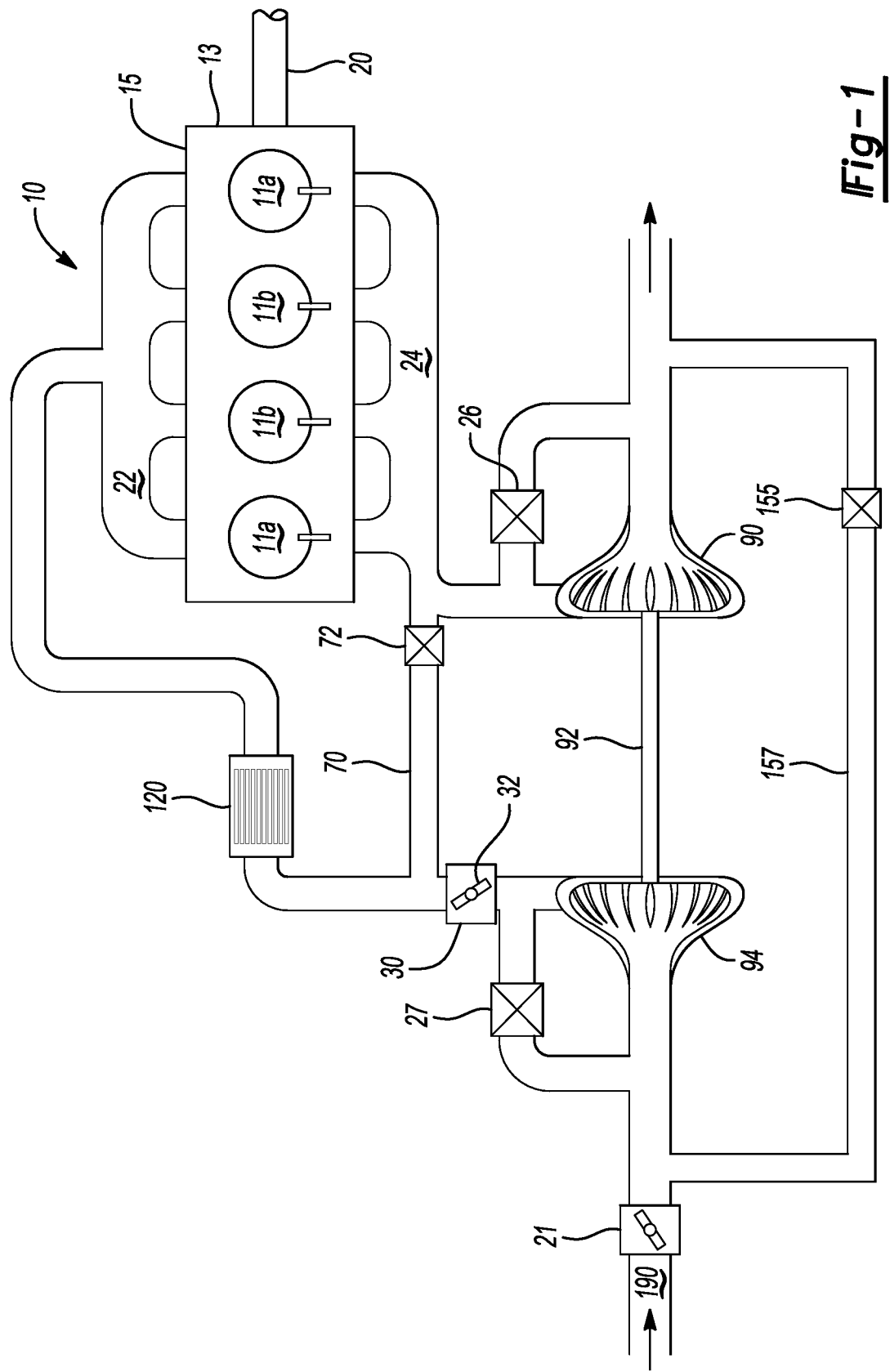
FIG. 1 is a diagrammatical view of an engine system.

Referring to FIG. 1, an engine system 10 may be a diesel engine, a gasoline engine, or other type of engine that utilizes various components in accordance with the present disclosure. The system 10 includes an internal-combustion engine 13 having a block defining a plurality of cylinders 11. The engine 10 is controlled by an engine controller sometimes referred to as an ECM or PCM. The engine 10 includes pistons (not shown) positioned within the cylinders 11 and connected to a crankshaft 20. The cylinders 11 communicate with an intake manifold 22 and an exhaust manifold 24 via respective intake and exhaust valves. The intake manifold 22 may be integrated within a cylinder head (not shown) or may be a stand-alone component. Additionally or alternatively, the exhaust manifold 24 may be integrated within the cylinder head or may be a stand-alone component. The illustrated engine 13 is an in-line four-cylinder diesel engine having a pair of outer cylinders 11a and a pair of inner cylinders 11b. Of course, other engine configurations are contemplated.

The intake manifold 22 communicates with a throttle body 30 via a throttle plate 32. While the throttle body 30 is depicted as being downstream of a compressor 94, it will be appreciated that the throttle body 30 may be placed upstream of the compressor 94 in other designs. Alternatively, or additionally, the throttle body 30 may be placed in the air induction tube upstream of the compressor.

The engine system 10 may include an exhaust gas recirculation (EGR) system to help lower NOx and other emissions. For example, the engine 10 may include a high-pressure EGR system in which exhaust gas is delivered to the intake manifold 22 by a high-pressure EGR passage 70 communicating with the exhaust manifold 24 at a location upstream of a turbine 90 of a compression device, e.g., a turbocharger, and communicating with the intake manifold 22 at a location downstream of the compressor 94. A high-pressure EGR valve assembly 72 may be located in a high-pressure EGR passage 70. Exhaust gas may then travel from the exhaust manifold 24 first through the high-pressure EGR passage 70, and then to the intake manifold 22. The amount of EGR provided to the intake passage 190, upstream of throttle body 30 and downstream of a charge-air cooler 120, may be varied by the controller via an EGR valve, such as the high-pressure EGR valve 72. An EGR cooler (not shown) may be included in high-pressure EGR tube 70 to cool re-circulated exhaust gases before entering the intake manifold. Cooling may be done using engine coolant or by an air-to-exhaust gas heat exchanger.

FIG. 1 also shows a low-pressure EGR system where EGR is routed from downstream of the turbine 90 to upstream of the compressor 94 through a low-pressure EGR passage 157. A low-pressure EGR valve 155 may control the amount of EGR provided to the intake passage 190. In some embodiments, the engine may include both a high-pressure EGR and a low-pressure EGR system, as shown in FIG. 1. In other embodiments, the engine may include either a low-pressure EGR system, a high-pressure EGR system, or none. When operable, the EGR system may increase the formation of condensate as it increases the water vapor concentration in the charge air, particularly when the charge air is cooled by a charge-air cooler.

A compression device may be a turbocharger (as shown), a supercharger, or the like. The depicted compression device may have a turbine 90 coupled with the exhaust manifold 24 and a compressor 94 coupled with the intake manifold 22 via a charger-air cooler (intercooler) 120, which may be an air-to-air heat exchanger, but could also be liquid cooled. The turbine 90 is typically coupled to the compressor 94 via a drive shaft 92. The speed of the turbine 90 may be controlled by a wastegate 26. A sequential turbocharger arrangement, single VGT, twin VGTs, or any other arrangement of turbochargers could be used and could include coolers within the compression device system, such as between two stages of compression.

The intake passage 190 may include an air-intake control valve 21. Additionally, the intake passage 190 may include a compressor bypass or recirculation valve (CRV) 27 configured to divert intake air around the compressor 94. The wastegate 26 and/or the CRV 27 may be controlled by the controller to be opened when a lower boost pressure is desired. For example, in response to compressor surge or a potential compressor-surge event, the controller may open the CRV 27 to decrease pressure at the outlet of the compressor 94. Additionally or alternatively, the CRV 27 and/or the wastegate 26 may be opened to decrease a pressure in the charge-air cooler 120 and as a result, reduce condensate formation in the charge-air cooler.

The compressor 94 may be upstream of the charge-air cooler 120 to provide compressed charge air to the charge-air cooler 120. The charge-air cooler 120 may be used to decrease the temperature of the turbocharged or supercharged compressed gas mixture. The charge-air cooler 120 may be an air-to-air cooler or a liquid-to-air cooler.

As explained above, condensate may accumulate in the charge-air cooler 120 and pool at the bottom. This water may be pulled into the engine, where it can cause combustion instability or hydro-lock if the water induction rate/amount is too high. As will be described in more detail below, the intake manifold includes features for managing the water. This allows for automatic draining while also avoiding combustion issues.

Figure 2:
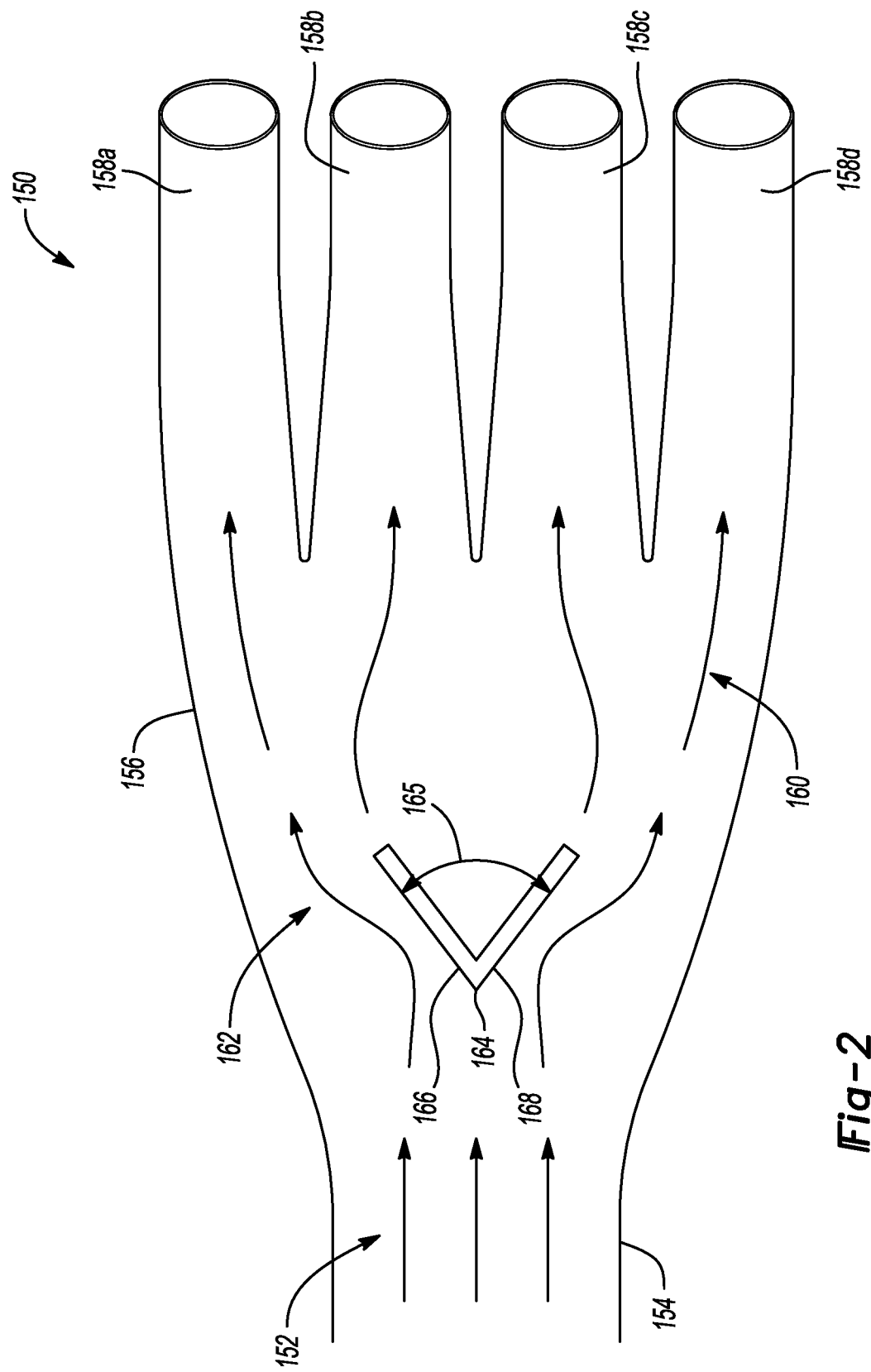
FIG. 2 is a schematic diagram of an intake manifold with a water deflector.

Referring to FIG. 2, an intake manifold 150, which is one example embodiment of the intake manifold 22, is designed to provide air and/or fuel to four cylinders of an engine. The intake manifold 150 may be integrated within a cylinder head or may be a stand-alone component. The intake manifold 150 includes an inlet opening 152 configured to receive air. The opening 152 may be coupled to a charge-air cooler, e.g., charge-air cooler 120, by an air duct 154. The manifold 150 includes an outer case or body 156 that defines the passageways within the manifold. The manifold 150 includes intake runners 158 and a chamber 160 that is common to the runners 158. The chamber 160 is disposed downstream of the inlet 152 and upstream of the runners 158. Each of the runners 158 is associated with one of the cylinders. In the illustrated embodiment, the manifold 150 includes four runners. Each of the runners 158 extends from its distal end (located at or near the intake port) to the chamber 160. The runners 158 are configured to circulate air and/or fuel from the chamber 160 to their associated cylinder when their intake valve is open.

The runners 158a and 158d are outer runners that supply the charge air to the front and back cylinders, and the runners 158c and 158d supply the charge air to the inner cylinders. The central location of the inlet 152 creates a more direct path to the inner runners 158b and 158c than the outer runners 158a and 158d. Thus, if any water is entering the intake manifold from the charge-air cooler, more of that water enters the inner runners (158b and 158c) than the outer runners (158a and 158d). This unequal distribution of the water can overload the inner cylinders while the outer cylinders still have capacity for accepting water without issue. That is, if the water from the charge-air cooler was more evenly distributed amongst all cylinders, the engine could perform without issue. Stated another way, evenly distributing the water between the runners increases the water tolerance of the engine.

The intake manifold 150 includes a water deflector 162 configured to more evenly distribute the water amongst the runners 158. The water deflector 162 is disposed in the chamber 160 within an air path that extends from the inlet 152 to the runners 158. The water deflector 162 is in front of the inner runners to place an obstacle between the inlet 152 and the inner runners 158b and 158c to deflect some of the water towards one or more of the outer runners 158a and 158d. The water deflector 162 severs the direct path from the inlet 152 to the inner runners to more evenly distribute the water among the runners.

The water deflector 162 has one or more deflection surfaces 166 angled relative to the air path to deflect water towards one of the outer runners, e.g., runner 158a. The water deflector 162 may include a second deflection surface 168 that is angled relative to the air path to deflect water towards the other of the outer runners, e.g., runner 158d. The angle 165 can be increased or decreased to control the flow characteristics within the intake manifold. Generally, increasing the angle deflects more water towards the outer runners and decreasing the angle permits more water to flow towards the inner runners. In one or more embodiments, the angle 165 is less than 90 degrees, but this is just an example. The deflection surfaces 166, 168 may be joined at a leading edge 164 to form a wedge-shaped deflector 162 (also referred to as a wedge). In the illustrated embodiment, the wedge has a hollow back side, however, the backside may be closed in other embodiments. The shape of the backside can be tuned to control eddies on the backside of the deflector as desired. For example, the deflector 162 may be wedge-shaped on the leading or downstream side and maybe also wedge-shaped or the like on the backside to reduce eddies and increase flow around the deflector.

The placement of the water deflector is dependent upon the location of the inlet 152 relative to the runners. In the shown symmetrical intake manifold, the water deflector 162 may be positioned on a centerline of the intake manifold 150 with the one or more deflection surfaces extending at an oblique angle relative to the centerline. This places the deflection surface transverse to at least a portion of the airflow path causing the outward deflection of the water towards the outer runner(s). But, the water deflector may be placed in another location in an asymmetrical intake manifold. It may be generally desirable to place the water deflector at a location in front of the intake runner that has the most direct path to the inlet. In the illustrated embodiment, that is the runners 158b and 158c.

The shape of the water deflector is not limited to the illustrated embodiments. In the shown example, the water deflector 162 has one or more flat deflector surfaces that may be formed as a wedge shape. However, a curved deflection surface may also be used in some implementations. For example, the water deflector 162 may have a single cylindrical leading surface the urges water outwardly. In other embodiments, the deflector maybe a flat plate that is angled perpendicular to the direction of flow or a flat plate that is angled obliquely relative to the direction of flow.

The water deflector 162 may be rigidly fixed within the intake manifold. For example, the water deflector 162 may be affixed to a surface of the body 156 such as the bottom or top surface. In other embodiments, the water deflector may be movable into and out of the airflow path so that the water deflector is only present when water is sensed or anticipated. Here, an actuator selectively moves the water deflector into the airflow path responsive to the presence of water beyond a threshold.

Figure 3:
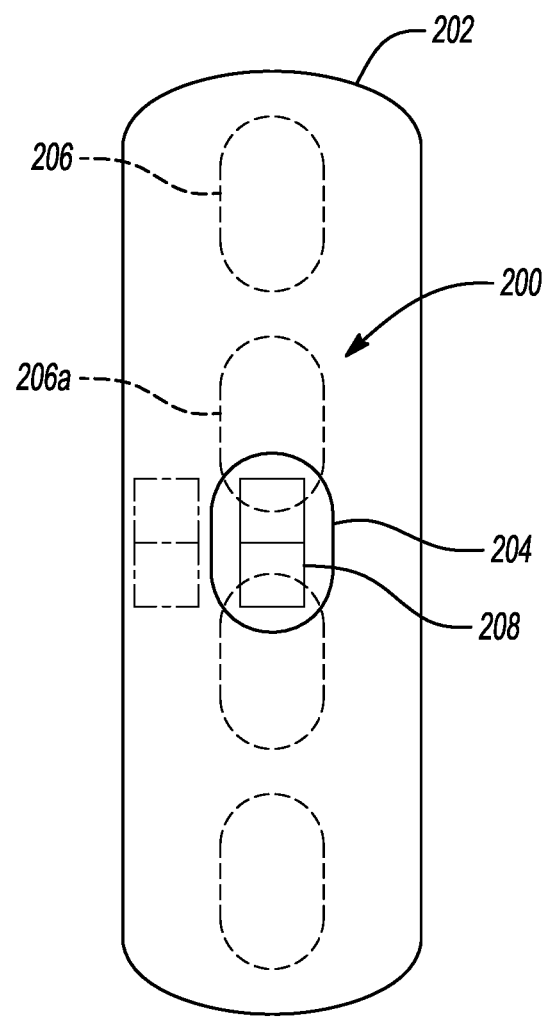
FIG. 3 is a schematic diagram of another intake manifold with a movable water deflector.

FIG. 3 illustrates an example embodiment of a movable water deflector. Another intake manifold 200 may be defined within a cylinder head 202 of an engine. The cylinder head 202 defines a central opening 204 of the intake manifold 200. The intake manifold 200 includes a plurality of runners 206 as described above. A water deflector 208 is disposed between the inner runners 206 and the central inlet 204. The water deflector 208 is shown as a wedge but may take other forms as described above. The water deflector 208 has a first position (shown solid line type) in which the water deflector is disposed in the airflow path between the opening 204 and the inner runners 206a. An actuator (not shown) is configured to move the water deflector 208 to a second position (shown in phantom line type). In the second position, the water deflector 208 is outside of the airflow path.

The actuator may be controlled by a controller of the vehicle, such as the PCM. The water deflector 208 may normally be in the second position where it is out of the way. When the controller senses water or conditions indicating the likely presence of water, the controller commands the actuator to move the water deflector 208 to the first position. In one example, water is sensed by tracking accelerator pedal tip-ins and load conditions. For example, if a large tip-in occurs after several hours of light load conditions, this may be indicative of possible water. Of course, this just one example and the vehicle controller may determine the likelihood of water in other ways.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An engine comprising: a block defining cylinders; a charge-air cooler; and an intake manifold configured to receive air from the charge-air cooler and convey the air to the cylinders, the intake manifold including: an inlet connected in fluid communication with the charge-air cooler, a pair of outer runners and at least one inner runner that are each associated with one of the cylinders, and a wedge disposed in an air path between the inlet and the runners with a leading edge of the wedge facing the inlet, wherein the wedge has a first deflection surface extending from the leading edge towards one of the outer runners such that the first deflection surface is configured to deflect water condensed in the charge-air cooler towards the one of the outer runners and has a second deflection surface extending from the leading edge towards the other of the outer runners such that the second deflection surface is configured to deflect the water towards the other of the outer runners.

2. The engine of claim 1, wherein an angle between the first and second deflection surfaces is less than 90 degrees.

3. The engine of claim 1 further comprising a turbocharger in fluid communication with the charge-air cooler.

4. The engine of claim 1, wherein the intake manifold is defined within a cylinder head of the engine.

5. The engine of claim 1, wherein the wedge is movable between a first position in which the wedge is disposed in the air path and a second position in which the wedge is not in the air path.

6. An intake manifold of an engine comprising: an inlet connectable to a charge-air cooler; a common chamber downstream of the inlet; a plurality of runners downstream of the common chamber and configured to route air from the common chamber to associated engine cylinders, wherein the runners include a pair of outer runners and at least one inner runner; and a wedge disposed in the common chamber in an air path between the inlet and the runners with a leading edge of the wedge facing the inlet, the wedge being positioned in front of the least one inner runner to deflect water, formed in the charge-air cooler, away from the at least one inner runner and towards the outer runners.

7. The intake manifold of claim 6, wherein the runners includes a second inner runner, and the wedge is arranged to deflect water away from the second inner runner.

8. The intake manifold of claim 6, wherein the wedge includes a pair of deflection surfaces that are angled relative to the air path.

9. The intake manifold of claim 8, wherein the deflection surfaces are joined at the leading edge.

10. The intake manifold of claim 6, wherein the wedge is movable between a first position in which the wedge is disposed in the air path and a second position in which the wedge is not in the air path.

11. An engine comprising: a block defining cylinders; a charge-air cooler; and a cylinder head defining an intake manifold in fluid communication with the charge-air cooler, the intake manifold including: a common chamber, a plurality of runners downstream of the common chamber and configured to route air from the common chamber to associated ones of the cylinders, wherein the runners include a pair of outer runners and at least one inner runner; and a wedge-shaped water deflector disposed in the common chamber at a location that is front of the at least one inner runner and arranged to deflect water, formed in the charge-air cooler, away from the at least one inner runner towards the outer runners.

12. The engine of claim 11, wherein the wedge-shaped water deflector is movable between a first position in which the wedge-shaped water deflector is disposed in the common chamber and a second position in which the wedge-shaped water deflector is not in the common chamber.

\* \* \* \* \*

UNITED STATES PATENT AND TRADEMARK OFFICE
CERTIFICATE OF CORRECTION

| | |
|---|---|
| PATENT NO. | : 11,536,230 B1 |
| APPLICATION NO. | : 17/510465 |
| DATED | : December 27, 2022 |
| INVENTOR(S) | : Shuya Shark Yamada et al. |

It is certified that error appears in the above-identified patent and that said Letters Patent is hereby corrected as shown below:

On the Title Page

Item (54) and in the Specification, Column 1, Lines 1-3, Delete:
"CHARGE-AIR COOLER AND WATER DISTRIBUTION DEVICE TO EVENLY PROVED WATER TO ENGINE CYLINDERS"

And Insert:
-- CHARGE-AIR COOLER AND WATER DISTRIBUTION DEVICE TO EVENLY PROVIDE WATER TO ENGINE CYLINDERS --.

Signed and Sealed this
Fourteenth Day of February, 2023

*Katherine Kelly Vidal*

Katherine Kelly Vidal
*Director of the United States Patent and Trademark Office*